United States Patent
Thesseling et al.

(10) Patent No.: US 11,296,579 B2
(45) Date of Patent: Apr. 5, 2022

(54) VERNIER EXTERNAL ROTOR MACHINE AND MOTOR SYSTEM

(71) Applicant: Lenze Drives GmbH, Extertal (DE)

(72) Inventors: Matthias Thesseling, Hameln (DE); Heiko Stichweh, Springe (DE); Volker Grabs, Bodenwerder (DE)

(73) Assignee: Lenze Drives GmbH, Extertal (DE)

( * ) Notice: Subject to any disclaimer, the term of this patent is extended or adjusted under 35 U.S.C. 154(b) by 81 days.

(21) Appl. No.: 16/082,114

(22) PCT Filed: Feb. 24, 2017

(86) PCT No.: PCT/EP2017/054372
§ 371 (c)(1),
(2) Date: Sep. 4, 2018

(87) PCT Pub. No.: WO2017/148825
PCT Pub. Date: Sep. 8, 2017

(65) Prior Publication Data
US 2019/0089223 A1    Mar. 21, 2019

(30) Foreign Application Priority Data

Mar. 4, 2016 (DE) ............. 10 2016 203 616.5

(51) Int. Cl.
| | |
|---|---|
| *H02K 7/10* | (2006.01) |
| *H02K 11/215* | (2016.01) |
| *H02K 11/33* | (2016.01) |
| *H02K 1/27* | (2006.01) |
| *H02K 1/14* | (2006.01) |
| *H02K 21/22* | (2006.01) |

(Continued)

(52) U.S. Cl.
CPC ............ *H02K 7/1016* (2013.01); *H02K 1/14* (2013.01); *H02K 1/2786* (2013.01); *H02K 7/102* (2013.01); *H02K 7/1004* (2013.01); *H02K 11/215* (2016.01); *H02K 11/33* (2016.01); *H02K 21/22* (2013.01)

(58) Field of Classification Search
CPC .......................... H02K 1/2786; H02K 7/1016
USPC .... 310/216.066, 216.067, 216.068, 216.106, 310/216.108
See application file for complete search history.

(56) References Cited

U.S. PATENT DOCUMENTS

| | | |
|---|---|---|
| 4,757,220 A | 7/1988 | Pouillange |
| 5,918,360 A | 7/1999 | Forbes et al. |

(Continued)

FOREIGN PATENT DOCUMENTS

| | | |
|---|---|---|
| CN | 201966740 U | 9/2011 |
| CN | 102638128 A | 8/2012 |

(Continued)

OTHER PUBLICATIONS

International Search Report (PCT/ISA/210) issued in PCT Application No. PCT/EP2017/054372 dated May 12, 2017 with English translation (six (6) pages).

(Continued)

*Primary Examiner* — Quyen P Leung
*Assistant Examiner* — Minki Chang
(74) *Attorney, Agent, or Firm* — Crowell & Moring LLP

(57) ABSTRACT

A Vernier external rotor machine for direct drive of a load is provided. The Vernier external rotor machine includes an external rotor configured to mechanically directly drive to a load.

5 Claims, 2 Drawing Sheets

(51) Int. Cl.
  *H02K 7/102* (2006.01)
  *H02K 1/2786* (2022.01)

(56) References Cited

U.S. PATENT DOCUMENTS

| | | | | |
|---|---|---|---|---|
| 6,710,505 B1* | 3/2004 | Barani | ................... | B65G 13/06 |
| | | | | 198/784 |
| 2004/0245887 A1* | 12/2004 | Fujinaka | ................ | H02K 1/146 |
| | | | | 310/216.114 |
| 2010/0295423 A1* | 11/2010 | Hsiao | ................... | H02K 7/1016 |
| | | | | 310/75 R |
| 2012/0086288 A1* | 4/2012 | Tanaka | ................... | H02K 37/04 |
| | | | | 310/46 |
| 2017/0167897 A1* | 6/2017 | Lackermaier | .......... | G01D 5/147 |

FOREIGN PATENT DOCUMENTS

| | | |
|---|---|---|
| CN | 104184290 A | 12/2014 |
| DE | 10 2009 050 185 | 10/2010 |
| EP | 0155 877 A1 | 9/1985 |
| EP | 0 790 695 A1 | 8/1997 |
| GB | 2 345 586 A | 7/2000 |
| WO | WO 2015/082317 A1 | 6/2015 |

OTHER PUBLICATIONS

German-language Written Opinion (PCT/ISA/237) issued in PCT Application No. PCT/EP2017/054372 dated May 12, 2017 (five (5) pages).
Chinese-language Office Action issued in Chinese Application No. 201780015139.5 dated Jun. 9, 2020 (eight (8) pages).

* cited by examiner

VERNIER EXTERNAL ROTOR MACHINE AND MOTOR SYSTEM

CROSS REFERENCE TO RELATED APPLICATIONS

This application is a national phase application of PCT International Application No. PCT/EP2017/054372, filed Feb. 24, 2017, which claims priority under 35 U.S.C. § 119 from German Patent Application No. 10 2016 203 616.5, filed Mar. 4, 2016, the entire disclosures of which are herein expressly incorporated by reference.

BACKGROUND AND SUMMARY OF THE INVENTION

The invention relates to a Vernier external rotor machine and to a motor system.

EP 0 155 877 A1 discloses a Vernier machine. The functional principle of Vernier machines of this kind is based on the use of magnetic flux modulators which cause a magnetic conductance which is dependent on the rotation angle. Otherwise, reference is also made to the relevant technical literature relating to Vernier machines.

The invention is based on the object of providing a Vernier machine and a motor system, which Vernier machine and motor system have properties which are improved in comparison to known Vernier machines.

The Vernier machine according to the invention is a Vernier external rotor machine, wherein the external rotor of the Vernier external rotor machine according to the invention is mechanically coupled directly, in particular without the interposition of a mechanical or any other gear mechanism, to a load or mechanical system to be driven, for example a drive belt or a drive chain. By way of example, the external rotor can form a driven roller within a conveyor element and/or a driven gear wheel.

The external rotor can be in the form of a drive roller or in the form of a gear wheel, wherein, for example, the load, to be driven, in the form of a drive belt or a drive chain runs around the drive roller or the gear wheel. The external rotor, that is to say the outer part of the rotor, can therefore serve directly for force transmission at the same time, for example form a running surface of a driven roller. Therefore, a direct drive structure can be realized.

The external rotor can be of non-laminated design. The external rotor can, for example, be composed of solid iron. An external rotor of this kind can be produced in a cost-effective manner in comparison to a laminated external rotor.

The stator can have a number of (for example between 3 and 20) stator teeth, wherein the stator teeth form a flux modulator of the Vernier external rotor machine. In this way, an additional modulator ring can be dispensed with. This leads to simple and compact geometries.

The air gap can be varied by means of a stator tooth or modulator tooth. A higher power factor, a higher torque density and lower torque ripple can be achieved in this way.

The motor system has an above-described Vernier external rotor machine. The external rotor is of anisotropic design, that is to say has, for example, (magnetic) properties which are dependent on a rotation angle position of the external rotor.

The motor system further has a device for determining a rotation angle position of the external rotor, wherein the device for determining a rotation angle position of the external rotor is designed to determine the rotation angle position of the external rotor depending on the anisotropy of the external rotor. The device for determining the rotation angle position of the external rotor can additionally evaluate motor currents and/or motor voltages for determining the rotation angle position.

The external rotor can have flux barriers for forming the anisotropy, in order to optimize the motor system, for example, for encoder-free control. By way of example, the flux barriers can be inserted into the rotor yoke.

The anisotropy and, respectively, the flux barriers can be formed, for example, by means of a tooth structure on an outer circumference of the external rotor, so that the external rotor can be used as an output drive for a toothed belt at the same time.

In order to form the anisotropy and, respectively, the flux barriers, the rotor can be structured, for example, in a simple manner from the outside, for example standard pipes which are subject to machining can be used. The resulting external anisotropy can be used, for example, as a toothed rim in order to drive a toothed belt for example.

The drive system can have a load to be driven, wherein the external rotor of the Vernier external rotor machine is mechanically coupled directly to the load to be driven.

The drive system can have a frequency converter which is designed to generate drive signals for the windings of the stator of the Vernier external rotor machine in such a way that a desired rotation speed and/or a desired torque of the Vernier external rotor machine are/is established.

The Vernier external rotor machine can have a housing into which parts of the Vernier external rotor machine, for example mechanical bearings, electrical connecting lines etc., are integrated.

The frequency converter can be arranged on the outside of the housing, for example mounted onto the housing, or mechanically coupled to the housing in axial extension of a motor shaft. As an alternative, the frequency converter can be arranged inside the housing.

The frequency converter can be designed to convert any braking energy of the load to be driven which may be present into thermal energy by generating the drive signals for the windings of the stator of the Vernier external rotor machine in such a way that a radiofrequency magnetic alternating field is induced in the external rotor, said radiofrequency magnetic alternating field generating heat in the external rotor. In other words, the braking energy is converted into thermal energy in the external rotor. In this case, the external rotor is not laminated or is a solid-iron external rotor.

The device for determining a rotation angle position of the external rotor can be integrated into the frequency converter and/or connected in a signal-transmitting manner to the frequency converter.

Other objects, advantages and novel features of the present invention will become apparent from the following detailed description of one or more preferred embodiments when considered in conjunction with the accompanying drawings.

BRIEF DESCRIPTION OF THE DRAWINGS

The invention will be described in detail below with reference to the drawing, in which.

DETAILED DESCRIPTION OF THE DRAWINGS

Figure 1:
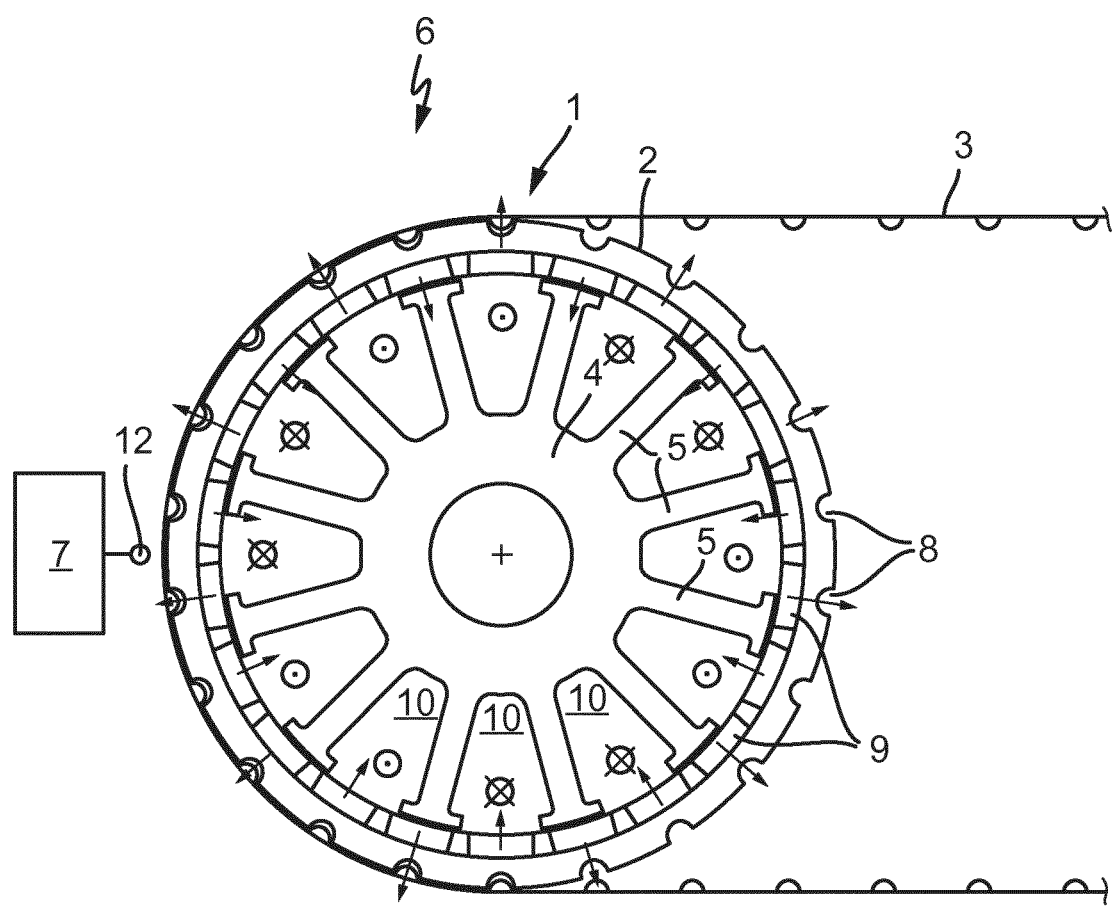
FIG. 1 shows a drive system according to the invention comprising a Vernier external rotor machine.

FIG. 1 shows a schematic cross section through a drive system 6 according to an embodiment of the invention comprising a Vernier external rotor machine 1.

An external rotor 2 of the Vernier external rotor machine 1 is mechanically coupled directly to a load 3 to be driven in the form of a toothed belt. Here, the external rotor 2 is in the form of a gear wheel which directly drives the toothed belt 3.

The external rotor 2 is not laminated and is composed of solid iron. A number of permanent magnets 9 with the illustrated polarity is arranged on an inner side of the external rotor 2.

The external rotor 2 has flux barriers 8 for forming an anisotropy. The flux barriers 8 are formed as teeth or a tooth structure in the solid iron and are uniformly distributed over the circumference of the external rotor 2.

An angle coding can also be realized by means of the flux barriers 8, wherein the flux barriers 8, in contrast to the manner illustrated in FIG. 1, are of angle-dependent design for this purpose.

The stator 4 of the Vernier machine 1 has 12 stator teeth 5. The modulator ring which is usually used is therefore integrated into the stator 4 and can be dispensed with. Windings 10 are associated with the stator teeth 5 in each case, that is to say the stator has a 3-phase, concentrated winding system.

The motor system 6 has a device 7 for determining a rotation angle position of the external rotor 2, wherein the device 7 for determining the rotation angle position of the external rotor 2 is designed to determine the rotation angle position of the external rotor 2 depending on the anisotropy of the external rotor 2. To this end, the device 7 can have, for example, a Hall sensor 12 which generates a signal which is dependent on the anisotropy and is evaluated by means of the device 7 for determining the rotation angle position.

Figure 2A:
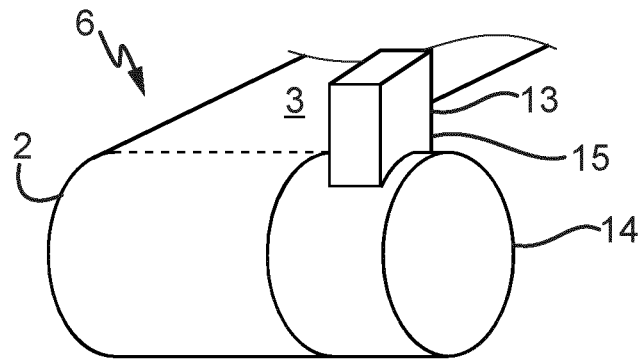
FIG. 2*a* shows a first variant of the drive system according to an embodiment of the invention from FIG. 1.

FIG. 2a shows a first variant of the drive system according to an embodiment of the invention from FIG. 1, which drive system is otherwise designed in the manner shown in FIG. 1. The motor system 6 has a frequency converter 13 which is designed to generate drive signals, for example in the form of drive voltages/drive currents with an adjustable amplitude/frequency, for the windings 10 of the stator 4 of the Vernier external rotor machine 1.

The Vernier external rotor machine 1 has a housing 14, for example composed of metal. The frequency converter 13 has a dedicated housing 15 which is mounted onto the housing 14 of the Vernier external rotor machine 1 and is mechanically coupled to said housing.

The frequency converter 13 is designed to convert any braking energy which may be present into thermal energy by generating the drive signals for the windings 10 of the stator 4 of the Vernier external rotor machine 1 in such a way that a radiofrequency magnetic alternating field is induced in the external rotor 2 which is not laminated for this case.

The device 7, shown in FIG. 1, for determining a rotation angle position of the external rotor 2 is integrated into the frequency converter 13. This allows encoder-free control by the converter 13.

Figure 2B:
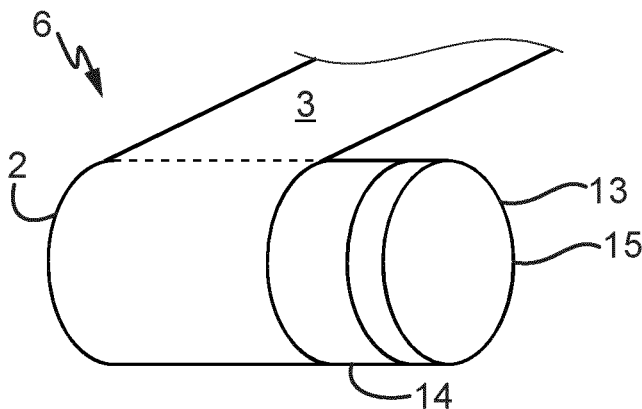
FIG. 2*b* shows a further variant of the drive system according to the invention from FIG. 1.

FIG. 2b shows a further variant of the drive system according to the invention from FIG. 1, in which drive system, based on the variant illustrated in FIG. 2a, the frequency converter 13 is mounted in axial extension onto the housing 14. Otherwise, the statements made in relation to the embodiment from FIG. 2a correspondingly apply.

Figure 2C:
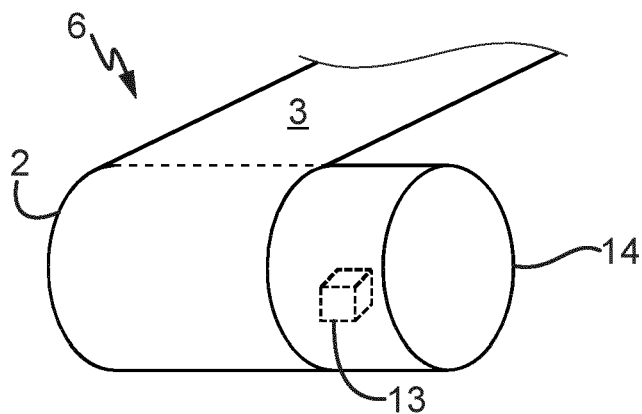
FIG. 2c shows a further variant of the drive system according to the invention from FIG. 1.

FIG. 2c shows a further variant of the drive system according to the invention from FIG. 1, in which drive system, based on the variant illustrated in FIG. 2a, the frequency converter 13 is arranged inside the housing 14. Otherwise, the statements made in relation to the embodiment from FIG. 2a correspondingly apply.

The motor systems 6 shown in FIGS. 2a to 2c contain all of the required drive components in prefabricated form, so that a user of the motor system 6 can integrate said motor system into a drive application directly and without further expenditure on assembly/interconnection.

The converter (electronics) can be attached to the Vernier external rotor machine, for example mounted onto the machine in a dedicated housing, inserted into the motor housing of the machine or axially attached to the machine (in a rigid, rotating manner).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor system, comprising:
an external rotor of a Vernier external rotor machine, wherein the external rotor is in the form of a gear wheel, wherein the gear wheel mechanically directly drives a load in the form of a drive chain running around the gear wheel, the external rotor is anisotropic with respect to magnetic properties by way of a tooth structure on an outer circumference of the external rotor forming the gear wheel;
a stator having a plurality of stator teeth configured to form a flux modulator of the Vernier external rotor machine;
a rotation angle sensor configured to determine a rotation angle position of the external rotor based on the anisotropy of the external rotor; and
a frequency converter configured to generate drive signals for windings of the stator,
wherein
the external rotor includes a housing,
the frequency converter is arranged inside the housing,
the rotation angle sensor for determining a rotation angle position of the external rotor is integrated into the frequency converter.

2. The motor system as claimed in claim 1, wherein the external rotor includes flux barriers configured to form the anisotropy.

3. The motor system as claimed in claim 1, wherein the frequency converter is configured to convert braking energy which may be present into thermal energy by generating stator winging drive signals which induce a radiofrequency magnetic alternating field in the external rotor.

4. The motor system as claimed in claim 1, wherein the rotation angle sensor is coupled in a signal-transmitting manner to the frequency converter.

5. A motor system, comprising:
an external rotor of a Vernier external rotor machine, wherein the external rotor is in the form of a gear wheel, wherein the gear wheel mechanically directly drives a load in the form of a drive chain running around the gear wheel, the external rotor is anisotropic with respect to magnetic properties by way of a tooth structure on an outer circumference of the external rotor forming the gear wheel;

a stator having a plurality of stator teeth configured to form a flux modulator of the Vernier external rotor machine;

a rotation angle sensor configured to determine a rotation angle position of the external rotor based on the anisotropy of the external rotor; and a frequency converter configured to generate drive signals for windings of the stator, wherein the external rotor includes a housing, the frequency converter is arranged on the outside of the housing, and the rotation angle sensor for determining a rotation angle position of the external rotor is integrated into the frequency converter.

\* \* \* \* \*